(12) United States Patent
Takiguchi

(10) Patent No.: US 10,527,864 B2
(45) Date of Patent: Jan. 7, 2020

(54) LIGHT MODULATION DEVICE AND OPTICAL SYSTEM HAVING INCREASED LIGHT USE EFFICIENCY BY CORRECTING PHASE DIFFERENCE DUE TO AN OPTICAL PATH DIFFERENCE BETWEEN TWO OPTICAL PATHS

(71) Applicant: HAMAMATSU PHOTONICS K.K., Hamamatsu-shi, Shizuoka (JP)

(72) Inventor: Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 153 days.

(21) Appl. No.: 15/506,800

(22) PCT Filed: Aug. 26, 2015

(86) PCT No.: PCT/JP2015/074079
§ 371 (c)(1),
(2) Date: Feb. 27, 2017

(87) PCT Pub. No.: WO2016/035646
PCT Pub. Date: Mar. 10, 2016

(65) Prior Publication Data
US 2017/0261760 A1    Sep. 14, 2017

(30) Foreign Application Priority Data
Sep. 2, 2014  (JP) .................. 2014-178024

(51) Int. Cl.
*G02B 27/28*  (2006.01)
*G02B 5/08*  (2006.01)
(Continued)

(52) U.S. Cl.
CPC .......... *G02B 27/283* (2013.01); *G01J 1/0429* (2013.01); *G01J 1/44* (2013.01);
(Continued)

(58) Field of Classification Search
CPC ........ G02B 27/283; G02B 5/08; G02B 27/28; G01J 1/0429; G01J 1/44; G01J 1/04; G02F 1/13; G02F 1/01; G02F 2203/06
See application file for complete search history.

(56) References Cited

U.S. PATENT DOCUMENTS 8,351,033 B2 *   1/2013   Katsunuma ............... G01J 3/02
                                                    356/327
8,902,432 B2 *  12/2014   Hirose ................... A61B 3/102
                                                    356/479
(Continued)

FOREIGN PATENT DOCUMENTS

CN        101408675 A      4/2009
CN        102483604 A      5/2012
(Continued)

OTHER PUBLICATIONS

Pedro M. Prieto et al., "Adaptive optics with a programmable phase modulator: applications in the human eye," Optics Express, Aug. 23, 2004, pp. 4059-4071, vol. 12, No. 17.
(Continued)

*Primary Examiner* — Que Tan Le
*Assistant Examiner* — Jennifer D Bennett
(74) *Attorney, Agent, or Firm* — Drinker Biddle & Reath LLP

(57) ABSTRACT

A light modulation apparatus includes a reflection type spatial light modulator, a polarization separating unit, a first polarization plane rotation unit, a polarization combining unit, and a second polarization plane rotation unit. The polarization separating unit separates input light, and outputs first separated light and second separated light. The first polarization plane rotation unit causes the first separated light to have P-polarization. A first region of a modulation plane of the spatial light modulator modulates the first separated light and outputs first modulated light, and a
(Continued)

second region modulates the second separated light and outputs second modulated light. The second polarization plane rotation unit causes the second modulated light to have S-polarization. The polarization combining unit combines the first modulated light and the second modulated light and outputs output light.

5 Claims, 5 Drawing Sheets

(51) Int. Cl.
    *G02F 1/13*     (2006.01)
    *G02F 1/01*     (2006.01)
    *G01J 1/04*     (2006.01)
    *G01J 1/44*     (2006.01)

(52) U.S. Cl.
    CPC ................ *G02B 5/08* (2013.01); *G02F 1/01* (2013.01); *G02F 1/13* (2013.01); *G02F 2203/06* (2013.01)

(56) References Cited

U.S. PATENT DOCUMENTS

| | | |
|---|---|---|
| 2004/0174582 A1 | 9/2004 | Asakura |
| 2004/0218248 A1 | 11/2004 | Tocnaye et al. |
| 2005/0185188 A1 | 8/2005 | McGrew |
| 2009/0244415 A1* | 10/2009 | Ide ........................ G02F 1/1313 349/33 |
| 2012/0249989 A1* | 10/2012 | Fujii .................. G02B 26/0833 355/71 |

FOREIGN PATENT DOCUMENTS

| | | | | |
|---|---|---|---|---|
| CN | 103349542 A | | 10/2013 | |
| EP | 2157472 A1 | | 2/2010 | |
| EP | 2314202 A1 | | 4/2011 | |
| JP | H05-103761 A | | 4/1993 | |
| JP | 2004-246362 | | 9/2004 | |
| JP | 2009-111223 A | | 5/2009 | |
| JP | 2009111223 A | * | 5/2009 | .......... G03F 7/70116 |
| JP | 2010-260063 A | | 11/2010 | |
| JP | 2010260063 A | * | 11/2010 | |
| JP | 2011-104332 A | | 6/2011 | |
| JP | 2012-019971 A | | 2/2012 | |
| JP | 5330892 B2 | | 10/2013 | |
| WO | WO 2008/149677 A1 | | 12/2008 | |

OTHER PUBLICATIONS

English-language translation of International Preliminary Report on Patentability (IPRP) dated Mar. 16, 2017 that issued in WO Patent Application No. PCT/JP2015/074079.

\* cited by examiner

LIGHT MODULATION DEVICE AND OPTICAL SYSTEM HAVING INCREASED LIGHT USE EFFICIENCY BY CORRECTING PHASE DIFFERENCE DUE TO AN OPTICAL PATH DIFFERENCE BETWEEN TWO OPTICAL PATHS

TECHNICAL FIELD

An aspect of the present invention relates to a light modulation apparatus and an optical system.

BACKGROUND ART

A spatial light modulator has a modulation plane in which a plurality of pixels for modulating amplitude or phase of input light and outputting light after modulation are arrayed, and can perform the amplitude modulation or the phase modulation in each pixel for the input light and output the light after modulation. Configurations and uses according to various aspects are known for the spatial light modulator. For example, technology described in Non Patent Document 1 intends to correct aberration of an optical system at the time of fundus measurement, using a spatial light phase modulator (PPM: Programmable Phase Modulator) to be a type of spatial light modulator and capable of performing only phase modulation.

CITATION LIST

Non Patent Literature

Non Patent Document 1: Pedro M. Prieto, Enrique J. Fernandez, Silvestre Manzanera, Pablo Artal, "Adaptive optics with a programmable phase modulator: applications in the human eye", Optics Express, Vol. 12, No. 17, pp. 4059-4071 (2004)

SUMMARY OF INVENTION

Technical Problem

According to a configuration of the spatial light modulator, the amplitude modulation or the phase modulation can be performed on light of linear polarization of a specific direction, however, the modulation may not be performed on light of linear polarization of a direction orthogonal to the specific direction. The PPM can perform the phase modulation on only light of the linear polarization of the specific direction. For this reason, the technology described in Non Patent Document 1 extracts only light of the linear polarization of the specific direction on which the phase modulation can be performed in the PPM by a polarizer, and inputs the extracted light of the linear polarization to the PPM.

As such, when the spatial light modulator capable of performing the modulation on only light of the linear polarization of the specific direction is used, light of the linear polarization of the direction orthogonal to the specific direction is blocked by the polarizer and is not used. Therefore, in the light modulation apparatus that performs the light modulation using such a spatial light modulator, light use efficiency (an intensity ratio between the light before modulation and the light after modulation) is low.

One aspect of the present invention has been made to solve the above problem, and an object thereof is to provide a light modulation apparatus that can increase light use efficiency even when a spatial light modulator capable of performing modulation on only light of linear polarization of a specific direction is used. In addition, an object of one aspect of the present invention is to provide an optical system that includes the light modulation apparatus and can increase light use efficiency.

Solution to Problem

A light modulation apparatus according to one aspect of the present invention includes: (1) a polarization separating unit for separating input light into light components having linear polarizations of directions orthogonal to each other, and outputting first separated light and second separated light; (2) a first polarization plane rotation unit for rotating a polarization plane of the first separated light or the second separated light output from the polarization separating unit, and causing the first separated light and the second separated light to have linear polarizations of directions equal to each other; (3) a reflection type spatial light modulator having a modulation plane in which a plurality of pixels for modulating amplitude or phase of input light and outputting light after modulation are arrayed and which includes a first region and a second region, and for modulating, of the first separated light and the second separated light having the linear polarizations of the directions equal to each other by the first polarization plane rotation unit, the first separated light in the first region and outputting first modulated light after modulation, and modulating the second separated light in the second region and outputting second modulated light after modulation; (4) a second polarization plane rotation unit for rotating a polarization plane of the first modulated light or the second modulated light output from the spatial light modulator, and causing the first modulated light and the second modulated light to have linear polarizations of directions orthogonal to each other; and (5) a polarization combining unit for combining the first modulated light and the second modulated light having the linear polarizations of the directions orthogonal to each other by the second polarization plane rotation unit into output light.

The light input to the light modulation apparatus having the above configuration is separated into light components of the linear polarizations of the directions orthogonal to each other by the polarization separating unit to be the first separated light and the second separated light. The first separated light and the second separated light are caused to have the linearly polarizations of the directions equal to each other by the first polarization plane rotation unit, and are input to the modulation plane of the spatial light modulator. Amplitude or phase of the first separated light is modulated in the first region of the modulation plane of the spatial light modulator and the first modulated light is output. Amplitude or phase of the second separated light is modulated in the second region of the modulation plane of the spatial light modulator and the second modulated light is output. Further, the first modulated light and the second modulated light output from the modulation plane of the spatial light modulator are caused to have the linear polarizations of the directions orthogonal to each other by the second polarization plane rotation unit, and are combined by the polarization combining unit to be the output light.

An optical system according to one aspect of the present invention includes a light source for outputting light; and the light modulation apparatus having the above configuration for inputting and modulating the light output from the light source, outputting light after modulation, and irradiating an object with the light. In the optical system, the light output from the light source is modulated in the light modulation apparatus, and then the object is irradiated with the light.

An optical system according to one aspect of the present invention includes the light modulation apparatus having the above configuration for inputting and modulating light generated in an object, and outputting light after modulation; and a detection unit for detecting the light output from the light modulation apparatus. In the optical system, the light generated in the object is modulated in the light modulation apparatus, and is then detected by the detection unit.

Advantageous Effects of Invention

According to one aspect of the present invention, light use efficiency can be increased even when a spatial light modulator capable of performing modulation on only light of linear polarization of a specific direction is used.

DESCRIPTION OF EMBODIMENTS

Hereinafter, embodiments of the present invention will be described in detail with reference to the accompanying drawings. In the description of the drawings, the same elements will be denoted by the same reference signs, without redundant description.

(First Embodiment)

Figure 1:
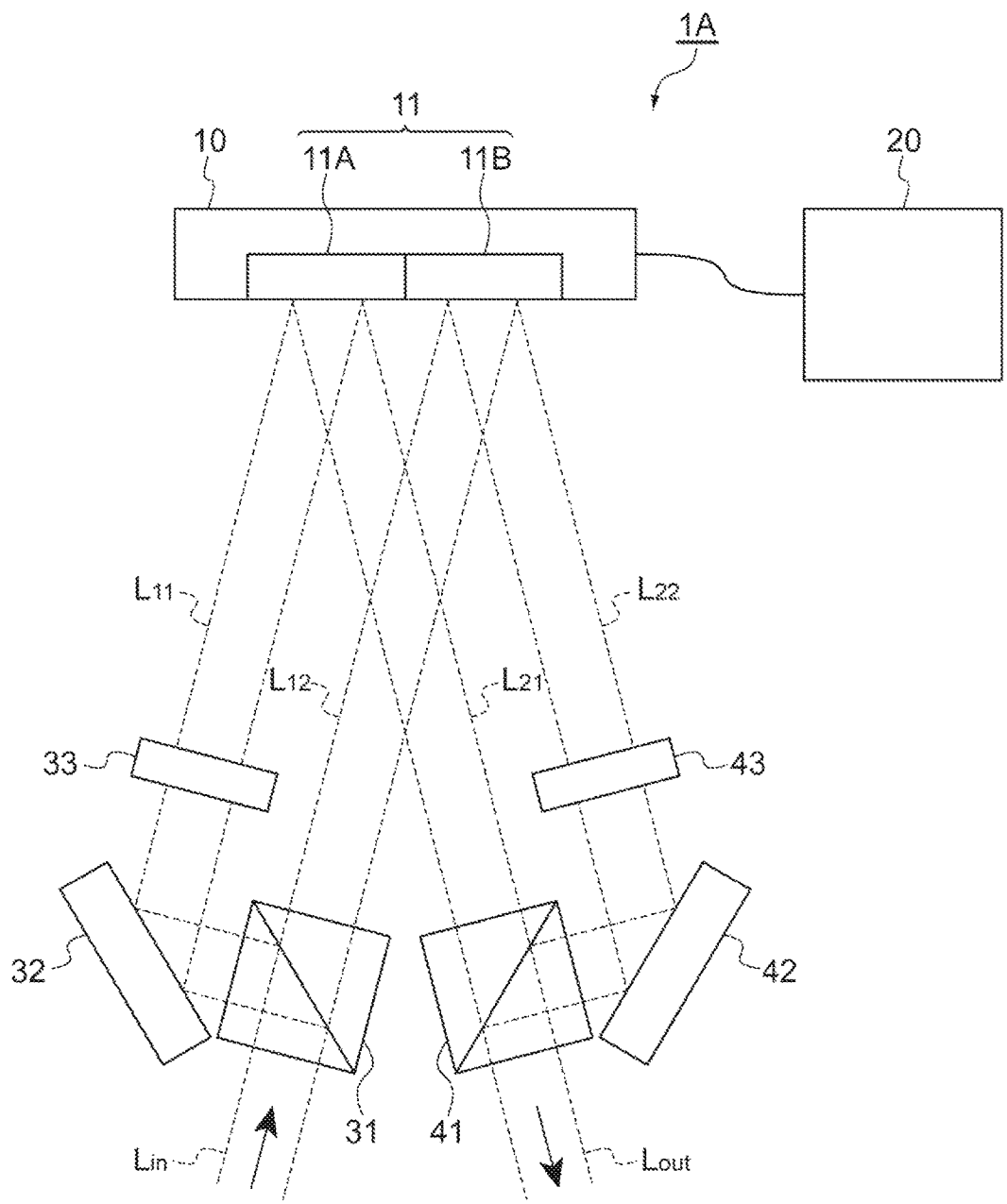
FIG. 1 is a diagram illustrating a configuration of a light modulation apparatus 1A according to a first embodiment.

FIG. 1 is a diagram illustrating a configuration of a light modulation apparatus 1A according to a first embodiment. The light modulation apparatus 1A according to the first embodiment includes a spatial light modulator 10, a control unit 20, a polarization separating unit 31, a reflecting mirror 32, a first polarization plane rotation unit 33, a polarization combining unit 41, a reflecting mirror 42, and a second polarization plane rotation unit 43.

The spatial light modulator 10 is of a reflection type and has a modulation plane 11 in which a plurality of pixels for modulating amplitude or phase of input light and outputting light after modulation are arrayed. The spatial light modulator 10 can perform the amplitude modulation or the phase modulation in each pixel for the input light and output the light after modulation. The spatial light modulator 10 may be, for example, a spatial light modulator using an electric address type liquid crystal element, a spatial light modulator using an optical address type liquid crystal element, or a variable mirror type spatial light modulator. The spatial light modulator 10 may perform only the amplitude modulation, perform only the phase modulation, or may perform both the amplitude modulation and the phase modulation.

The modulation plane 11 of the spatial light modulator 10 includes a first region 11A and a second region 11B. The first region 11A and the second region 11B can modulate the light independently, on the basis of drive signals provided from the control unit 20. The first region 11A inputs and modulates first separated light L11 transmitted from the first polarization plane rotation unit 33, and outputs first modulated light L21 after modulation to the polarization combining unit 41. The second region 11B inputs and modulates second separated light L12 transmitted from the polarization separating unit 31, and outputs second modulated light L22 after modulation to the second polarization plane rotation unit 43.

The polarization separating unit 31 inputs light Lin to be parallel light, separates the input light Lin into light components having linear polarizations of directions orthogonal to each other, and outputs the first separated light L11 and the second separated light L12. The polarization separating unit 31 is preferably a polarization beam splitter, and in this case, the unit can output the first separated light L11 by reflecting light of an S-polarization component in the input light Lin, and output the second separated light L12 by transmitting light of a P-polarization component. The reflecting mirror 32 reflects the first separated light L11 reflected and output by the polarization separating unit 31 and outputs to the first polarization plane rotation unit 33.

The first polarization plane rotation unit 33 inputs the first separated light L11 transmitted from the reflecting mirror 32, rotates a polarization plane of the first separated light L11 by 90°, and causes the first separated light L11 to have P-polarization. As a result, the first polarization plane rotation unit 33 can cause the first separated light L11 and the second separated light L12 to have linear polarizations (P-polarization) of directions equal to each other. The first polarization plane rotation unit 33 is preferably a ½ wave plate, a Faraday rotator, or the like.

The first separated light L11 output from the first polarization plane rotation unit 33 and the second separated light L12 transmitting and output from the polarization separating unit 31 propagate in parallel to each other and are input to the modulation plane 11 of the spatial light modulator 10. Both the first separated light L11 and the second separated light L12 input to the modulation plane 11 of the spatial light modulator 10 have the P-polarization. The spatial light modulator 10 is disposed such that the light of the P-polarization can be modulated. The first modulated light L21 output from the first region 11A of the modulation plane 11 and the second modulated light L22 output from the second region 11B of the modulation plane 11 propagate in parallel to each other.

The second polarization plane rotation unit 43 inputs the second modulated light L22 output from the second region 11B of the modulation plane 11, rotates a polarization plane of the second modulated light L22 by 90°, and causes the second modulated light L22 to have S-polarization. As a result, the second polarization plane rotation unit 43 can cause the first modulated light L21 and the second modulated light L22 to have linear polarizations of directions orthogonal to each other. The second polarization plane rotation unit 43 is preferably a ½ wave plate, a Faraday rotator, a prism, an optical system obtained by combining a plurality of reflecting mirrors, or the like. The reflecting mirror 42 reflects the second modulated light L22 output from the second polarization plane rotation unit 43 and outputs to the polarization combining unit 41.

The polarization combining unit 41 inputs the first modulated light L21 transmitted from the first region 11A of the modulation plane 11, inputs the second modulated light L22 transmitted from the reflecting mirror 42, combines the first modulated light L21 and the second modulated light L22 having linear polarizations of directions orthogonal to each other, and outputs output light Lout. The polarization combining unit 41 is preferably a polarization beam splitter, and in this case, the unit transmits the first modulated light L21 of the P-polarization and reflects the second modulated light L22 of the S-polarization, so that the unit can combine the light components.

The light modulation apparatus 1A operates as follows. The light Lin input to the light modulation apparatus 1A is separated into light components having linear polarizations of directions orthogonal to each other by the polarization separating unit 31, and is output as the first separated light L11 (S-polarized light) and the second separated light L12 (P-polarized light).

The first separated light L11 (S-polarized light) output from the polarization separating unit 31 is reflected by the reflecting mirror 32, the polarization plane is rotated by 90° by the first polarization plane rotation unit 33, and the light is caused to have the P-polarization. The first separated light L11 (P-polarized light) output from the first polarization plane rotation unit 33 is input to the first region 11A of the modulation plane 11 of the spatial light modulator 10, amplitude or phase is modulated in the first region 11A, and the light is output as the first modulated light L21. The second separated light L12 (P-polarized light) output from the polarization separating unit 31 is input to the second region 11B of the modulation plane 11 of the spatial light modulator 10, amplitude or phase is modulated in the second region 11B, and the light is output as the second modulated light L22.

The polarization plane of the second modulated light L22 output from the second region 11B of the modulation plane 11 is rotated by 90° by the second polarization plane rotation unit 43, and the light is caused to have the S-polarization. The first modulated light L21 (P-polarized light) output from the first region 11A of the modulation plane 11 and the second modulated light L22 (S-polarized light) output from the second polarization plane rotation unit 43 and reflected by the reflecting mirror 42 are combined by the polarization combining unit 41. The combined light Lout is output from the light modulation apparatus 1A.

As such, in the light modulation apparatus 1A, the input light Lin is separated into light components of linear polarizations of directions orthogonal to each other by the polarization separating unit 31, and becomes the first separated light L11 and the second separated light L12. The first separated light L11 and the second separated light L12 are caused to have linear polarizations of directions equal to each other by the first polarization plane rotation unit 33, and are input to the modulation plane 11 of the spatial light modulator 10 and amplitudes or phases thereof are modulated. Further, the first modulated light L21 and the second modulated light L22 output from the modulation plane 11 of the spatial light modulator 10 are caused to have linear polarizations of directions orthogonal to each other by the second polarization plane rotation unit 43, are combined by the polarization combining unit 41, and become the output light Lout.

Therefore, even when the spatial light modulator 10 can perform modulation on only light having linear polarization of a specific direction, light use efficiency is high in the light modulation apparatus 1A. In addition, the light modulation apparatus 1A can modulate the amplitude or the phase independently for each of the first separated light L11 and the second separated light L12 in the first region 11A and the second region 11B of the modulation plane 11 of the spatial light modulator 10, and as a result, the apparatus can modulate a polarization state as well as the amplitude or the phase for the input light Lin and can output the output light Lout.

The light modulation apparatus 1A may further include a third polarization plane rotation unit (not illustrated) that rotates a polarization plane of the output light Lout. Because the polarization plane of the output light Lout may be inclined with respect to the polarization plane of the input light Lin by 90°, the inclination of the polarization plane of the output light Lout can be matched with the inclination of the polarization plane of the input light Lin by the third polarization plane rotation unit. The inclination of the polarization plane of the output light Lout may be controlled to be the desired inclination by the third polarization plane rotation unit.

Next, the control unit 20 will be described in detail. The control unit 20 may be a device dedicated for the spatial light modulator 10, or may be configured using a versatile device such as a computer. In addition, the control unit 20 may be configured to be divided into the dedicated device and the versatile device. The control unit 20 provides a drive signal for driving the amplitude modulation or the phase modulation in each of the plurality of pixels of the modulation plane 11 of the spatial light modulator 10 to the spatial light modulator 10. The control unit 20 provides the drive signal for modulating light independently in each of the first region 11A and the second region 11B of the modulation plane 11 of the spatial light modulator 10 to the spatial light modulator 10.

The drive signal provided from the control unit 20 to the spatial light modulator 10 instructs a modulation amount of the amplitude or the phase in each of the plurality of pixels of the modulation plane 11, on the basis of a computer-generated hologram to be displayed on the spatial light modulator 10. The control unit 20 has an external input unit such as a keyboard to input a signal from the outside, a calculation unit to perform calculation of the computer-generated hologram and the like, a storage unit to store the computer-generated hologram and the like, a selection unit to select the computer-generated hologram stored in the storage unit on the basis of an input of a signal generated in the external input unit or inside, and a drive unit to generate a drive signal on the basis of the computer-generated hologram selected by the selection unit and provide the drive signal to the spatial light modulator 10.

The computer-generated hologram actually displayed on the spatial light modulator 10 of the phase modulation type is preferably obtained by adding a desired computer-generated hologram representing a desired phase modulation distribution to be displayed on the spatial light modulator 10, a computer-generated hologram for correction to correct phase distortion of a wave front of light generated inside or outside the light modulation apparatus 1A, and a computer-generated hologram for intensity modulation representing a blazed grating pattern having an intensity modulation distribution according to a diffraction efficiency distribution, in each pixel.

When the drive signal is generated in the control unit 20, preferably, a look-up table, in which a relationship of a drive signal value and a modulation amount (phase value) in each pixel is stored, is prepared in advance, and the drive signal value according to the modulation amount is obtained by referring to the look-up table.

Preferably, the control unit 20 holds in advance a temperature information table in which a relationship of the computer-generated hologram for correction and a temperature is stored, and obtains the computer-generated hologram for correction according to the temperature by referring to the temperature information table. When the computer-generated hologram for correction is stored, preferably, data compression is performed on the computer-generated hologram for correction and the hologram is stored. In this case, after the computer-generated hologram for correction on which the data compression has been performed is obtained, a process for performing data decompression on the hologram is necessary.

The control unit 20 needs to have a storage unit of a sufficient capacity according to a data amount, when the computer-generated hologram is stored. For example, in the case in which it is assumed that the computer-generated hologram is 8-bit data of an SVGA resolution (800 pixels× 600 pixels), when the data compression is not performed, a data amount of one computer-generated hologram becomes 480 kilobytes (=800×600×8 bits).

The control unit 20 gives an additional phase difference in addition to a phase difference to correct a phase difference due to an optical path difference between two optical paths until reaching from the polarization separating unit 31 to the polarization combining unit 41 via the spatial light modulator 10, in the phase modulation in each of the first region 11A and the second region 11B of the modulation plane 11 of the spatial light modulator 10, so that the control unit can set a polarization state of the output light Lout. The additional phase difference is set to 0 or π, so that the output light Lout can be caused to have linear polarization. The additional phase difference is set to π/2 or 3π/2, so that the output light Lout can be caused to have circular polarization. In addition, the additional phase difference is set to another value, so that the output light Lout can be caused to have elliptical polarization.

At this time (in particular, when the output light Lout is caused to have linear polarization), if the amplitude modulation is not performed in the first region 11A or the second region 11B of the modulation plane 11 of the spatial light modulator 10, the output light Lout shows a change of intensity according to a polarization angle α of linear polarization of the input light Lin. Therefore, it is preferable to perform correction of amplitude based on the following formula, for desired intensity I of the output light Lout. $A_1$ shows amplitude of light after correction in the first region 11A and $A_2$ shows amplitude of light after correction in the second region 11B.

$$A_1 = \sqrt{I} \cos \alpha$$

$$A_2 = \sqrt{I} \sin \alpha \qquad \text{[Formula 1]}$$

As described above, in the light modulation apparatus 1A according to the embodiment, even when the spatial light modulator 10 can perform the modulation on only light having linear polarization of the specific direction, light use efficiency is high. In addition, in the light modulation apparatus 1A, because an input-output direction of light for the modulation plane 11 of the spatial light modulator 10 is not a vertical direction but an inclined direction, light use efficiency is high in this regard.

The light modulation apparatus 1A according to the embodiment can modulate the polarization state as well as the amplitude or the phase for the input light Lin and output the output light Lout. In addition, the light modulation apparatus 1A can perform modulation such as random polarization.

The light modulation apparatus 1A according to the embodiment uses a reflection type modulator as the spatial light modulator 10, so that the polarization separating unit 31, the reflecting mirror 32, the first polarization plane rotation unit 33, the polarization combining unit 41, the reflecting mirror 42, and the second polarization plane rotation unit 43 can be disposed at one side with respect to the spatial light modulator 10, and therefore, size reduction and cost reduction can be realized. In addition, the light modulation apparatus 1A divides the modulation plane 11 of one spatial light modulator 10 into the first region 11A and the second region 11B and modulates light in each region, and therefore, size reduction and cost reduction can be realized in this regard. Even if a pixel number increase and a size increase in the spatial light modulator advance in the future, a size increase of the light modulation apparatus can be suppressed.

The light modulation apparatus 1A according to the embodiment does not need to include a mechanical movable unit, and is robust against a vibration and the like.

(Second Embodiment)

Figure 2:
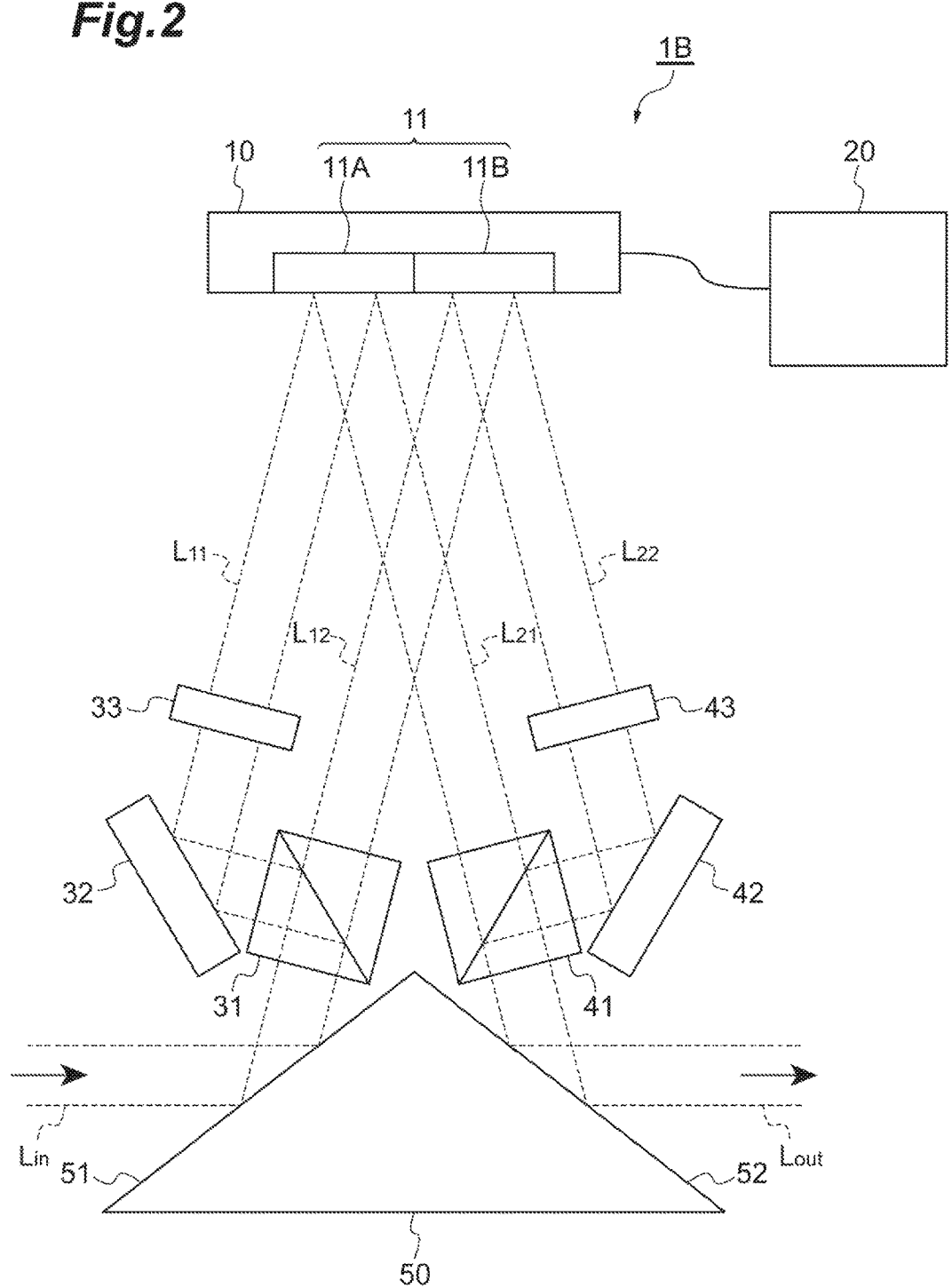
FIG. 2 is a diagram illustrating a configuration of a light modulation apparatus 1B according to a second embodiment.

FIG. 2 is a diagram illustrating a configuration of a light modulation apparatus 1B according to a second embodiment. The light modulation apparatus 1B according to the second embodiment further includes a light input-output unit 50 in addition to the configuration (FIG. 1) of the light modulation apparatus 1A according to the first embodiment. The light input-output unit 50 has a first reflecting surface 51 and a second reflecting surface 52. The first reflecting surface 51 reflects light Lin input from the outside to a polarization separating unit 31. The second reflecting surface 52 reflects light Lout from a polarization combining unit 41 and outputs the light to the outside. An output direction of the output light Lout from the second reflecting surface 52 is the same as an input direction of the input light Lin to the first reflecting surface 51. The light input-output unit 50 is configured using a prism or a plurality of reflecting mirrors, for example.

The light modulation apparatus 1B according to the second embodiment operates in the same way as the light modulation apparatus 1A according to the first embodiment and achieves the same effects, and in addition, the apparatus achieves the following effects. In the second embodiment, the output direction of the output light Lout from the second reflecting surface 52 and the input direction of the input light Lin to the first reflecting surface 51 are parallel to each other, so that a system including the light modulation apparatus 1B is easily constructed. In addition, principal rays of the output light Lout from the second reflecting surface 52 and principal rays of the input light Lin to the first reflecting surface 51 are on the same straight line, so that a system including the light modulation apparatus 1B is easily constructed.

(Third Embodiment)

Figure 3:
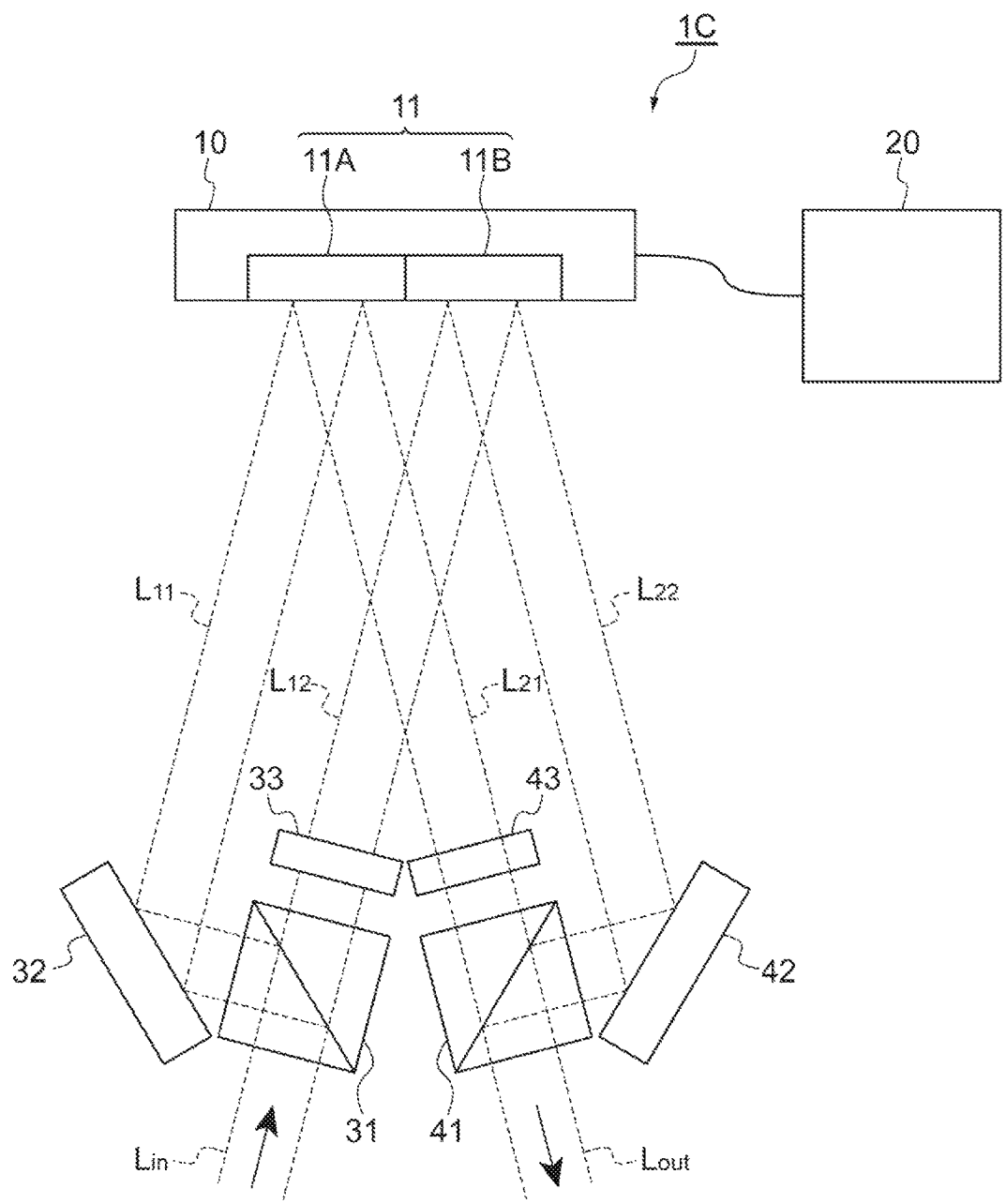
FIG. 3 is a diagram illustrating a configuration of a light modulation apparatus 1C according to a third embodiment.

FIG. 3 is a diagram illustrating a configuration of a light modulation apparatus 1C according to a third embodiment. The light modulation apparatus 1C according to the third embodiment is different from the configuration (FIG. 1) of the light modulation apparatus 1A according to the first embodiment in positions where a first polarization plane rotation unit 33 and a second polarization plane rotation unit 43 are provided, respectively; and in that a spatial light modulator 10 is disposed such that first separated light L11 and second separated light L12 having S-polarization can be modulated.

The first polarization plane rotation unit 33 is provided on an optical path of the second separated light L12 and rotates a polarization plane of the second separated light L12 by 90°. As a result, the first polarization plane rotation unit 33 can cause the first separated light L11 and the second separated light L12 to have linear polarizations (S-polarization) of directions equal to each other.

The second polarization plane rotation unit 43 is provided on an optical path of first modulated light L21 and rotates a polarization plane of the first modulated light L21 by 90°. As a result, the second polarization plane rotation unit 43 can cause the first modulated light L21 and the second modulated light L22 to have linear polarizations of directions orthogonal to each other.

The light modulation apparatus 1C operates as follows. Light Lin input to the light modulation apparatus 1C is separated into light components having linear polarizations of directions orthogonal to each other by a polarization separating unit 31 and is output as the first separated light L11 (S-polarized light) and the second separated light L12 (P-polarized light).

The first separated light L11 (S-polarized light) output from the polarization separating unit 31 is reflected by a reflecting mirror 32, the light is input to a first region 11A of a modulation plane 11 of the spatial light modulator 10, amplitude or phase is modulated in the first region 11A, and the light is output as the first modulated light L21. The polarization plane of the second separated light L12 (P-polarized light) output from the polarization separating unit 31 is rotated by 90° by the first polarization plane rotation unit 33, and the light is caused to have S-polarization. The second separated light L12 (S-polarized light) output from the first polarization plane rotation unit 33 is input to a second region 11B of the modulation plane 11 of the spatial light modulator 10, amplitude or phase is modulated in the second region 11B, and the light is output as the second modulated light L22.

The polarization plane of the first modulated light L21 output from the first region 11A of the modulation plane 11 is rotated by 90° by the second polarization plane rotation unit 43, and the light is caused to have P-polarization. The first modulated light L21 (P-polarized light) output from the second polarization plane rotation unit 43 and the second modulated light L22 (S-polarized light) output from the second region 11B of the modulation plane 11 and reflected by the reflecting mirror 42 are combined by a polarization combining unit 41. The combined light Lout is output from the light modulation apparatus 1C.

The light modulation apparatus 1C according to the third embodiment achieves the same effects as the light modulation apparatus 1A according to the first embodiment. Even in the configuration of the light modulation apparatus 1C according to the third embodiment, a light input-output unit 50 may be provided, similar to the light modulation apparatus 1B according to the second embodiment.

(Fourth Embodiment)

Figure 4:
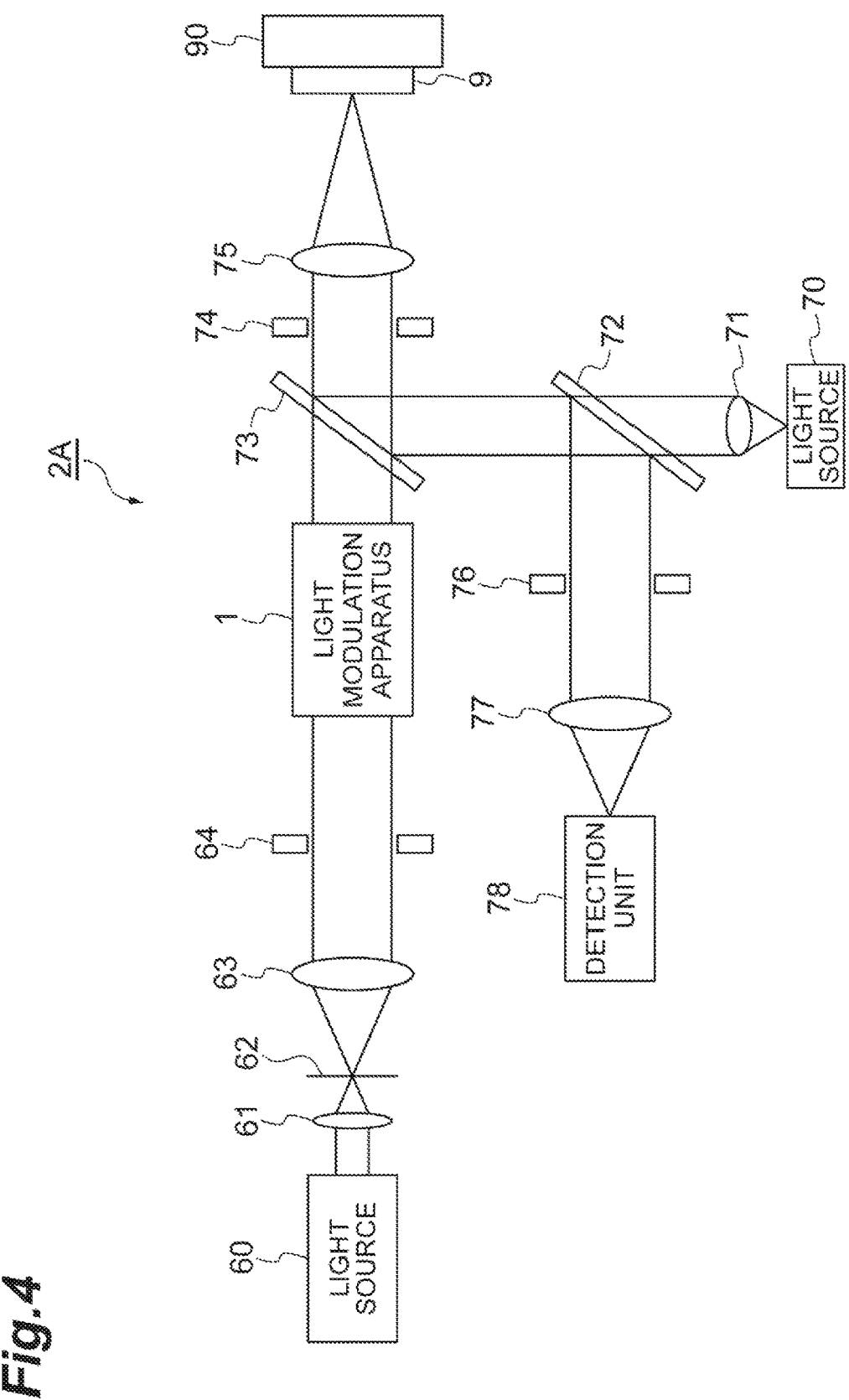
FIG. 4 is a diagram illustrating a configuration of an optical system 2A according to a fourth embodiment.

FIG. 4 is a diagram illustrating a configuration of an optical system 2A according to a fourth embodiment. The optical system 2A according to the fourth embodiment irradiates an object 9 with light modulated by a light modulation apparatus 1. Here, the light modulation apparatus 1 may be any one of the light modulation apparatuses 1A to 1C according to the first to third embodiments. Light irradiation to the object 9 may be simple irradiation and may be optical processing or excitation of the object 9.

The optical system 2A includes a light source 60, a lens 61, a spatial filter 62, a lens 63, an aperture 64, a light source 70, a lens 71, a beam splitter 72, a beam splitter 73, an aperture 74, a lens 75, an aperture 76, a lens 77, a detection unit 78, and a stage 90, in addition to the light modulation apparatus 1.

The light source 60 outputs light with which the object 9 is irradiated, and is preferably a laser light source. The lenses 61 and 63 input the light output from the light source 60, expand a beam diameter of the light, and output parallel light. The spatial filter 62 provided between the lens 61 and the lens 63 adjusts an intensity distribution in a beam cross-section of the light, and uniformizes light intensity in a predetermined cross-sectional region including an optical axis, for example. The aperture 64 inputs the light output from the lens 63, and selectively outputs light of a predetermined cross-sectional region in a beam cross-section of the light. An object of the aperture 64 is, for example, to align the optical axis, control a segmentation region (used when a use diameter of a beam is matched with an optical system), change a beam shape (not limited to a circular shape and changed to any shape such as a rectangular shape), or restrict an intensity distribution in advance.

The light modulation apparatus 1 inputs and modulates the light output from the aperture 64, and outputs light after modulation. The beam splitter 73 transmits the light modulated and output by the light modulation apparatus 1 to the aperture 74, and reflects the light output and transmitted from the light source 70 to the aperture 74. The aperture 74 inputs the light transmitted from the beam splitter 73, and selectively outputs light of a predetermined cross-sectional region in a beam cross-section of the light, and the aperture has the similar function as the aperture 64. The lens 75 guides the light output from the aperture 74 to the object 9. The lens 75 may focus the light output from the aperture 74 on a surface or an inside of the object 9, or may image a modulation plane 11 of a spatial light modulator 10 of the light modulation apparatus 1 on the surface or the inside of the object 9.

The light source 70 outputs light with which the object 9 is irradiated for observing the object 9. The light source 70 may be a monochromatic light source such as a laser light source and may be a white light source. The lens 71 causes the light output from the light source 70 to be parallel light. The beam splitter 72 transmits a part of the light transmitted from the lens 71 to the beam splitter 73, and reflects a part of the light transmitted from the beam splitter 73 to the aperture 76.

The aperture 76 inputs the light transmitted from the beam splitter 72, and selectively outputs light of a predetermined cross-sectional region in a beam cross-section of the light, and the aperture has the similar function as the aperture 64. The lens 77 guides the light output from the aperture 76 to the detection unit 78. The lens 77 may focus the light output from the aperture 76 on a light receiving plane of the detection unit 78, or may image a light irradiation plane in the object 9 on the light receiving plane of the detection unit 78. The detection unit 78 receives and detects the light transmitted from the lens 77. The detection unit 78 may detect light receiving intensity, or may detect a one-dimensional or two-dimensional light intensity distribution.

The stage 90 holds the object 9. The stage 90 preferably adjusts a position or a direction of the object 9, and preferably adjusts for at least one of an x axis, a y axis, a z axis, a θ axis, an α axis, and a β axis. The adjustment of the position or the direction may be based on an electric operation or a manual operation.

The optical system 2A operates as follows. A beam diameter of the light output from the light source 60 is expanded by the lenses 61 and 63, the light becomes parallel light, an intensity distribution in a beam cross-section is adjusted by the spatial filter 62, and a predetermined cross-sectional region in a beam cross-section is selected by the aperture 64, and then, the light is input to the light modulation apparatus 1. The light modulated and output by the light modulation apparatus 1 transmits the beam splitter 73, passes through the aperture 74 and the lens 75, and is focused or forms an image on the object 9 held by the stage 90.

Light for observation output from the light source 70 becomes parallel light by the lens 71, transmits the beam splitter 72, is reflected by the beam splitter 73, passes through the aperture 74 and the lens 75, and the object 9 held by the stage 90 is irradiated with the light. Light generated in the object 9 by irradiation of the light for observation to the object 9 passes through the lens 75 and the aperture 74, is reflected by the beam splitter 73, is further reflected by the beam splitter 72, passes through the aperture 76 and the lens 77, and is received by the detection unit 78. Intensity of the light generated in the object 9 by irradiation of the light for observation to the object 9 is detected by the detection unit 78, or an intensity distribution of the light generated in the object 9 is detected.

In this embodiment, preferably, a wavelength of the light output from the light source 60 is determined according to an object of light irradiation to the object 9, and further, a condition in which amplitude or phase can be sufficiently modulated in the spatial light modulator 10 of the light modulation apparatus 1. When the spatial light modulator 10 is of a phase modulation type, in the wavelength of the light output from the light source 60, a phase modulation width in the spatial light modulator 10 is preferably secured by π[rad] or more.

Each of the lenses 61, 63, 71, 75, and 77 may be one lens, or may be a lens group including a plurality of lenses.

In each of the apertures 64, 74, and 76, an arrangement position is preferably adjusted, and a size or a shape of an opening region is preferably adjusted. The aperture may be a Fourier mask, or may be an intensity mask having a transmittance distribution. An aperture may be provided on an optical path in the light modulation apparatus 1.

When the object 9 is irradiated with the light output from the light source 70, an introduction position or an illumination method (Kohler illumination, critical illumination, or the like) can be appropriately selected according to a use or the object 9. A beam splitter to input or output the light for observation may be provided on the optical path in the light modulation apparatus 1. A transmission type light source for observation may be provided.

(Fifth Embodiment)

Figure 5:
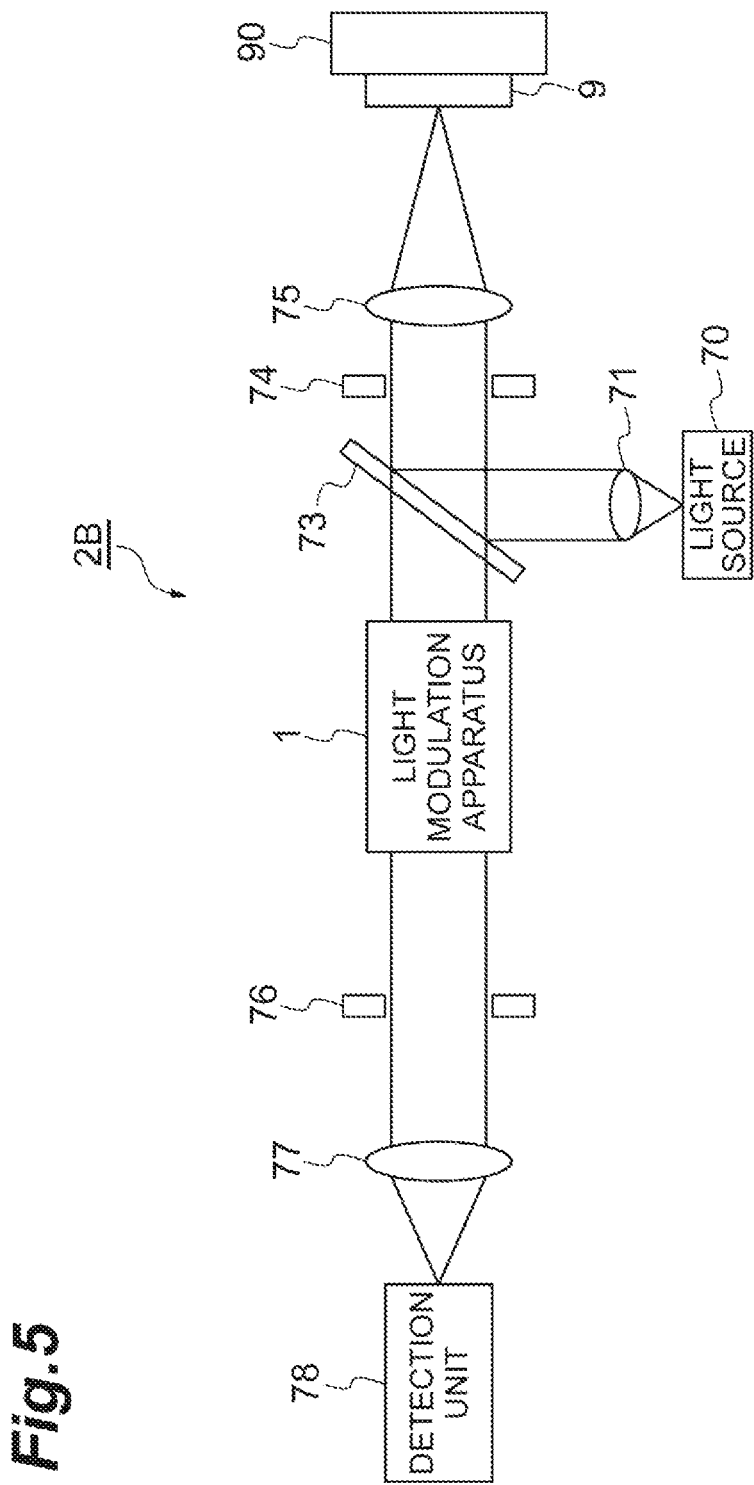
FIG. 5 is a diagram illustrating a configuration of an optical system 2B according to a fifth embodiment.

FIG. 5 is a diagram illustrating a configuration of an optical system 2B according to a fifth embodiment. The optical system 2B according to the fifth embodiment modulates light generated in an object 9 by a light modulation apparatus 1, and then detects the light. Here, the light modulation apparatus 1 may be any one of the light modulation apparatuses 1A to 1C according to the first to third embodiments. The light generated in the object 9 may be light (for example, transmitted light, reflected light, scattered light, fluorescence, and luminescence by a non-linear optical phenomenon) generated in the object 9 due to light irradiation to the object 9, or may be light (for example, chemiluminescence) generated in the object 9, regardless of light irradiation. Hereinafter, a configuration in which reflected light from the object 9 is modulated by the light modulation apparatus 1 and is then detected will be described.

The optical system 2B includes a light source 70, a lens 71, a beam splitter 73, an aperture 74, a lens 75, an aperture 76, a lens 77, a detection unit 78, and a stage 90, in addition to the light modulation apparatus 1.

The light source 70 outputs light with which the object 9 is irradiated. The light source 70 may be a monochromatic light source such as a laser light source and may be a white light source. The lens 71 causes the light output from the light source 70 to be parallel light. The beam splitter 73 reflects a part of the light transmitted from the lens 71 to the aperture 74, and transmits a part of the light transmitted from the aperture 74 to the light modulation apparatus 1. The aperture 74 inputs the light transmitted from the beam splitter 73, and selectively outputs light of a predetermined cross-sectional region in a beam cross-section of the light. An object of the aperture 74 is, for example, to align an optical axis, control a segmentation region (used when a use diameter of a beam is matched with an optical system), change a beam shape (not limited to a circular shape and changed to any shape such as a rectangular shape), or restrict an intensity distribution in advance. The lens 75 guides the light output from the aperture 74 to the object 9.

The light modulation apparatus 1 inputs and modulates the light generated in the object 9 and transmitted via the lens 75, the aperture 74, and the beam splitter 73, and outputs light after modulation. The aperture 76 inputs the light modulated and output by the light modulation apparatus 1, and selectively outputs light of a predetermined cross-sectional region in a beam cross-section of the light, and the aperture has the similar function as the aperture 74. The lens 77 guides the light output from the aperture 76 to the detection unit 78. The lens 77 may focus the light being output from the aperture 76 on a light receiving plane of the detection unit 78, or may image a light irradiation plane in the object 9 on the light receiving plane of the detection unit 78. The detection unit 78 receives and detects the light transmitted from the lens 77. The detection unit 78 may detect light receiving intensity, or may detect a one-dimensional or two-dimensional light intensity distribution.

The optical system 2B operates as follows. The light output from the light source 70 becomes parallel light by the lens 71, is reflected by the beam splitter 73, passes through the aperture 74 and the lens 75, and the object 9 held by the stage 90 is irradiated with the light. Light generated in the object 9 by irradiation of the light to the object 9 passes through the lens 75 and the aperture 74, transmits the beam splitter 73, and is input to the light modulation apparatus 1. The light modulated and output by the light modulation apparatus 1 passes through the aperture 76 and the lens 77, and is received by the detection unit 78. Intensity of the light generated in the object 9 by irradiation of the light output from the light source 70 to the object 9 is detected by the detection unit 78, or an intensity distribution of the light generated in the object 9 is detected.

In this embodiment, preferably, a wavelength of the light output from the light source 70 is determined according to an object of light irradiation to the object 9, and further, a condition in which amplitude or phase can be sufficiently modulated in the spatial light modulator 10 of the light modulation apparatus 1. When the spatial light modulator 10 is of a phase modulation type, in the wavelength of the light output from the light source 70, a phase modulation width in the spatial light modulator 10 is preferably secured by π[rad] or more.

Each of the lenses 71, 75, and 77 may be one lens, or may be a lens system including a plurality of lenses.

In each of the apertures 74 and 76, an arrangement position is preferably adjusted, and a size or a shape of an opening region is preferably adjusted. The aperture may be a Fourier mask, or may be an intensity mask having a transmittance distribution. An aperture may be provided on an optical path in the light modulation apparatus 1.

When the object 9 is irradiated with the light output from the light source 70, an introduction position or an illumination method (Kohler illumination, critical illumination, or the like) can be appropriately selected according to a use or the object 9. A beam splitter to input or output light may be provided on the optical path in the light modulation apparatus 1. A transmission type light source for observation may be provided.

(Modifications)

The present invention is not limited to the embodiments described above and various modifications can be made.

In the embodiments, the first polarization plane rotation unit 33 rotates the polarization plane of any one of the first separated light L11 and the second separated light L12 by 90°, and the second polarization plane rotation unit 43 rotates the polarization plane of any one of the first modulated light L21 and the second modulated light L22 by 90°. However, the first polarization plane rotation unit 33 may rotate the polarization planes of both the first separated light L11 and the second separated light L12, and may cause the first separated light L11 and the second separated light L12 to have linear polarizations of directions equal to each other. In addition, the second polarization plane rotation unit 43 may rotate the polarization planes of both the first modulated light L21 and the second modulated light L22, and may cause the first modulated light L21 and the second modulated light L22 to have linear polarizations of directions orthogonal to each other.

The first polarization plane rotation unit 33 may be disposed at any position on an optical path between the modulation plane 11 of the spatial light modulator 10 and the polarization separating unit 31. The first polarization plane rotation unit 33 may be provided on the modulation plane 11 of the spatial light modulator 10, may be provided on a reflecting surface of the reflecting mirror 32, or may be provided on an output surface of the polarization separating unit 31.

The second polarization plane rotation unit 43 may be disposed at any position on an optical path between the modulation plane 11 of the spatial light modulator 10 and the polarization combining unit 41. The second polarization plane rotation unit 43 may be provided on the modulation plane 11 of the spatial light modulator 10, may be provided on a reflecting surface of the reflecting mirror 42, or may be provided on an input surface of the polarization combining unit 41.

Each of the polarization separating unit 31 and the polarization combining unit 41 is not limited to the polarization beam splitter, and may be another optical element capable of performing polarization separating/polarization combining. Each of the first polarization plane rotation unit 33 and the second polarization plane rotation unit 43 is not limited to the ½ wave plate or the Faraday rotator, and may be another optical element capable of rotating a polarization plane of light.

A general optical component such as a filter, a dichroic mirror, and an expansion-reduction optical system may be inserted into an optical path between the light source 60 and the spatial light modulator 10, an optical path between the spatial light modulator 10 and the object 9, or an optical path between the spatial light modulator 10 and the detection unit 78, or the like.

An observation system to observe the object 9 using the light output from the light source 70 is preferably an imaging system, and may be an imaging system including a camera lens, a microscope, or a telescope. Data acquired by the observation system may be a transmission image, transmitted light intensity, a fluorescence image, fluorescence intensity, a luminescence image, luminescence intensity, a scattering image, or scattering intensity. A wavelength of observation light may be selected according to the object 9. In addition, a mechanism for changing a position (for each element) of the observation system may be attached, and control may be executed by an external signal or a feedback signal.

When the computer-generated hologram for intensity modulation representing the blazed grating pattern is displayed on the spatial light modulator 10, the object 9 is irradiated with diffracted light of specific order of which intensity has been modulated by the blazed grating pattern, and further, diffracted light (including zero-order light) of orders other than the specific order is also generated. Because the diffracted light of the orders other than the specific order is unnecessary light, it is preferable to prevent the object 9 from being irradiated with the unnecessary light, or it is preferable to prevent actual damage from occurring, even when the object 9 is irradiated with the unnecessary light.

To prevent the object 9 from being irradiated with the unnecessary light, the unnecessary light may be blocked by focusing the light modulated by the spatial light modulator 10 by a lens and disposing an aperture, a knife edge, or the like in the vicinity of a light focusing point of the lens, or the light of the specific order may be selectively collimated by a 4f optical system provided in a subsequent stage of the spatial light modulator 10. To prevent the actual damage from occurring, even when the object 9 is irradiated with the unnecessary light, irradiation of the unnecessary light to the object 9 may be dispersed and an energy density of the unnecessary light may be decreased.

The light modulation apparatus according to the embodiment is configured to include (1) a polarization separating unit for separating input light into light components having linear polarizations of directions orthogonal to each other, and outputting first separated light and second separated light; (2) a first polarization plane rotation unit for rotating a polarization plane of the first separated light or the second separated light output from the polarization separating unit, and causing the first separated light and the second separated light to have linear polarizations of directions equal to each other; (3) a reflection type spatial light modulator having a modulation plane in which a plurality of pixels for modulating amplitude or phase of input light and outputting light after modulation are arrayed and which includes a first region and a second region, and for modulating, of the first separated light and the second separated light having the linear polarizations of the directions equal to each other by the first polarization plane rotation unit, the first separated light in the first region and outputting first modulated light after modulation, and modulating the second separated light in the second region and outputting second modulated light after modulation; (4) a second polarization plane rotation unit for rotating a polarization plane of the first modulated light or the second modulated light output from the spatial light modulator, and causing the first modulated light and the second modulated light to have linear polarizations of directions orthogonal to each other; and (5) a polarization combining unit for combining the first modulated light and the second modulated light having the linear polarizations of the directions orthogonal to each other by the second polarization plane rotation unit into output light.

Preferably, the light modulation apparatus having the above configuration further includes a light input-output unit having a first reflecting surface for reflecting the input light to the polarization separating unit and a second reflecting surface for reflecting the output light from the polarization combining unit, an output direction of the output light from the second reflecting surface being equal to an input direction of the input light to the first reflecting surface.

The optical system according to the embodiment is configured to include a light source for outputting light; and the light modulation apparatus having the above configuration for inputting and modulating the light output from the light source, outputting light after modulation, and irradiating an object with the light. In the optical system, the light output from the light source is modulated in the light modulation apparatus, and then the object is irradiated with the light.

The optical system according to the embodiment is configured to include the light modulation apparatus having the above configuration for inputting and modulating light generated in an object, and outputting light after modulation; and a detection unit for detecting the light output from the light modulation apparatus. In the optical system, the light generated in the object is modulated in the light modulation apparatus, and is then detected by the detection unit.

INDUSTRIAL APPLICABILITY

The present invention can be used as a light modulation apparatus that can increase light use efficiency even when a spatial light modulator capable of performing modulation on only light having linear polarization of a specific direction is used, and an optical system that includes the light modulation apparatus and can increase light use efficiency.

REFERENCE SIGNS LIST 1, 1A to 1C—light modulation apparatus, 2A, 2B—optical system, 9—object, 10—spatial light modulator, 11—modulation plane, 11A—first region, 11B—second region, 20—control unit, 31—polarization separating unit, 32—reflecting mirror, 33—first polarization plane rotation unit, 41—polarization combining unit, 42—reflecting mirror, 43—second polarization plane rotation unit, 50—light input-output unit, 51—first reflecting surface, 52—second reflecting surface, 60—light source, 61—lens, 62—spatial filter, 63—lens, 64—aperture, 70—light source, 71—lens, 72—beam splitter, 73—beam splitter, 74—aperture, 75—lens, 76—aperture, 77—lens, 78—detection unit, 90—stage, Lin—input light, Lout—output light, L11—first separated light, L12—second separated light, L21—first modulated light, L22—second modulated light.

The invention claimed is:

1. A light modulation apparatus comprising:
a polarization separating unit configured to separate input light into light components having linear polarizations of directions orthogonal to each other, and output first separated light and second separated light;
a first polarization plane rotation unit configured to rotate a polarization plane of the first separated light or the second separated light output from the polarization separating unit, and cause the first separated light and the second separated light to have linear polarizations of directions equal to each other;
a reflection type spatial light modulator being a single spatial light modulator configured to perform modulation on only light having linear polarization of a specific direction, and having a modulation plane in which a plurality of pixels for modulating amplitude or phase of input light and outputting light after modulation are arrayed and which includes a first region and a second region, and configured to modulate, of the first separated light and the second separated light having the linear polarizations of the directions equal to each other by the first polarization plane rotation unit, the first separated light in the first region and output first modulated light after modulation, and modulate the second separated light in the second region and output second modulated light after modulation;
a second polarization plane rotation unit configured to rotate a polarization plane of the first modulated light or the second modulated light output from the spatial light modulator, and cause the first modulated light and the second modulated light to have linear polarizations of directions orthogonal to each other;
a polarization combining unit configured to combine the first modulated light and the second modulated light having the linear polarizations of the directions orthogonal to each other by the second polarization plane rotation unit into output light; and
a controller configured to provide a drive signal to the spatial light modulator for modulating light independently in each of the first region and the second region of the modulation plane of the spatial light modulator,
wherein
the controller gives a phase difference to correct a phase difference due to a optical path difference between two optical paths until reaching from the polarization separating unit to the polarization combining unit via the spatial light modulator, in the phase modulation in each of the first region and the second region of the modulation plane of the spatial light modulator.

2. The light modulation apparatus according to claim 1, further comprising:
a light input-output unit having a first reflecting surface for reflecting the input light to the polarization separating unit and a second reflecting surface for reflecting the output light from the polarization combining unit, an output direction of the output light from the second reflecting surface being equal to an input direction of the input light to the first reflecting surface.

3. An optical system comprising:
a light source configured to output light; and
the light modulation apparatus according to claim 1 configured to input and modulate the light output from the light source, output light after modulation, and irradiate an object with the light.

4. An optical system comprising:
the light modulation apparatus according to claim 1 configured to input and modulate light generated in an object, and output light after modulation; and
a detection unit configured to detect the light output from the light modulation apparatus.

5. The light modulation apparatus according to claim 2, wherein the light input-output unit includes a prism having the first surface and the second reflecting surface.

* * * * *